US010671555B2

(12) United States Patent
Takahashi et al.

(10) Patent No.: US 10,671,555 B2
(45) Date of Patent: Jun. 2, 2020

(54) STORAGE SYSTEM AND STORAGE APPARATUS

(71) Applicant: Hitachi, Ltd., Tokyo (JP)

(72) Inventors: Hideaki Takahashi, Tokyo (JP); Hiroshi Yoshimine, Kanagawa (JP)

(73) Assignee: HITACHI, LTD., Tokyo (JP)

( * ) Notice: Subject to any disclaimer, the term of this patent is extended or adjusted under 35 U.S.C. 154(b) by 426 days.

(21) Appl. No.: 15/552,815

(22) PCT Filed: Apr. 17, 2015

(86) PCT No.: PCT/JP2015/061786
§ 371 (c)(1),
(2) Date: Aug. 23, 2017

(87) PCT Pub. No.: WO2016/166880
PCT Pub. Date: Oct. 20, 2016

(65) Prior Publication Data
US 2018/0032459 A1    Feb. 1, 2018

(51) Int. Cl.
*G06F 7/00* (2006.01)
*G06F 13/38* (2006.01)
(Continued)

(52) U.S. Cl.
CPC .............. *G06F 13/38* (2013.01); *G06F 13/10* (2013.01); *G06F 21/602* (2013.01); *G06F 21/606* (2013.01)

(58) Field of Classification Search
CPC .................................................. G06F 2221/21
(Continued)

(56) References Cited

U.S. PATENT DOCUMENTS

| 2004/0177183 A1 | 9/2004 | Takahashi et al. |
| 2005/0216692 A1 | 9/2005 | Watanabe et al. |
| 2015/0020169 A1* | 1/2015 | Mori .................. H04L 67/02 726/4 |

FOREIGN PATENT DOCUMENTS

| JP | 2004-199668 A | 7/2004 |
| JP | 2005-275525 A | 10/2005 |
| JP | 2015-060264 A | 3/2015 |

OTHER PUBLICATIONS

International Search Report of PCT/JP2015/061786 dated Jun. 23, 2015.

* cited by examiner

*Primary Examiner* — Alexandria Y Bromell
(74) *Attorney, Agent, or Firm* — Mattingly & Malur, PC

(57) ABSTRACT

A storage system has a management server computer and a storage apparatus. The storage apparatus has a management processor connected to a management server computer via a first network, and a plurality of I/O processors that are connected to the management processor via a second network, that are connected to a storage device, and that conduct I/O with the storage device. The management server computer generates a command for any I/O processor of the plurality of I/O processors. The management server computer encapsulates and encrypts the command to generate an encrypted message, and sends the encrypted message to the management processor. The management processor receives the encrypted message and selects an I/O processor of the plurality of I/O processors as a first address on the basis of the command; and decrypts and undoes the encapsulation of the message to restore the command, and sends the command to the first address.

4 Claims, 13 Drawing Sheets

(51) Int. Cl.
*G06F 13/10* (2006.01)
*G06F 21/60* (2013.01)

(58) Field of Classification Search
USPC .......................................................... 707/781
See application file for complete search history.

Fig. 2

List of APIDs 300

| APID | Communication type | Function | BMC | App type | Remarks |
|---|---|---|---|---|---|
| 0x01 | Communication with MP | Collect Dump | CTL1/CTL2 | Communication App / L7SW | |
| 0x02 | Communication with MP | Obtain F/W ver | CTL1/CTL2 | Communication App / L7SW | |
| 0x03 | Communication with MP | Obtain PCB Rev | CTL1/CTL2 | Communication App / L7SW | |
| 0x04 | Communication with MP | Refer to configuration information | CTL1/CTL2 | Communication App / L7SW | |
| | ... | | | | |
| 0x10 | Communication with MP | Maintenance block instruction | CTL1/CTL2 | Communication App | |
| | ... | | | | |
| 0x81 | Communication with BMC | BMC and F/W replacement instruction | CTL1/CTL2 | Communication App | |
| 0x82 | Communication with BMC | Obtain result of progress of BMC and F/W replacement instruction | CTL1/CTL2 | Communication App | |
| 0x83 | Communication with BMC | BMC network configuration change request | CTL1/CTL2 | Communication App | |
| 0x84 | Communication with BMC | Refer to BMC configuration information | CTL1/CTL2 | Communication App | |
| | ... | | | | |

L7SW table 41

| MssgID 401 | Transmission-source IP 402 | Transmission-destination IP 403 | SSL structure pointer 404 | Coupling status 405 | MP number 406 | FD number between management server and BMC 407 | FD number between BMC and MP 408 |
|---|---|---|---|---|---|---|---|
| 0x0010 | 10.213.54.251 | 126.255.0.48 | 0x1F00_65E0 | 30 | #00 | 0003 | 0145 |
| 0x0011 | 10.213.54.251 | 126.255.0.48 | 0x1F00_32F1 | 30 | #00 | 0566 | 0098 |
| ... | | | | | | | |
| 0x0011 | 10.0.0.15 | 126.255.4.50 | 0x1F40_9E5F | 10 | #18 | 0451 | 0015 |
| ... | | | | | | | |

Fig. 4

Exclusive control table 121

| MP number 501 | Status 502 | In-entry APID 503 | Request-source ID type 504 | Request-source ID 505 | Request-source IP 506 |
|---|---|---|---|---|---|
| #00 | In execution | 0x01 | PID | 1528 | 126.255.0.15 |
| #01 | In execution | 0x04 | MssgID | 0x0010 | 10.213.54.251 |
| #02 | Waiting for entry | - | - | - | - |
| #03 | Entry prohibited | - | - | - | - |
| ... | | | | | |
| #n | | - | - | - | - | ly, to a storage system and a storage apparatus.

STORAGE SYSTEM AND STORAGE APPARATUS

TECHNICAL FIELD

The present invention relates to a technology for maintaining and managing a storage apparatus.

BACKGROUND ART

A storage apparatus includes components that are a physical storage device, a channel board, a disk adapter board, and a control board including one or more processors, and the like. These elements are coupled to each other. The channel board is a front-end interface, and is coupled to a host computer via a communication network, such as FC (Fibre Channel) or iSCSI (Internet Small Computer System Interface), for example. The disk adapter board is a back-end interface, and is coupled to the physical storage device via a communication network, such as SAS (Serial Attached SCSI), for example. The control board includes one or more processors.

The storage apparatus is an apparatus that performs I/O (Input or Output) processes from the host computer. More specifically, upon receipt of an I/O request from the host computer, the processor of the storage apparatus reads or writes data from and to the physical storage device in response to the I/O request.

A management server computer and a maintenance terminal are coupled to the storage apparatus. The management server computer and the maintenance terminal maintain and manage the storage apparatus through communication with the processor.

SUMMARY OF INVENTION

Technical Problem

The management server computer is coupled to the control board via the communication network, and performs control for processor maintenance and management. Consequently, communication from the management server computer to the storage apparatus is sometimes exposed to attack from the outside of the storage apparatus.

Solution to Problem

To solve the problem described above, a storage system that is an aspect of the present invention includes a management server computer and a storage apparatus. The storage apparatus has a management processor connected to a management server computer via a first network, and a plurality of I/O processors that are connected to the management processor via a second network, that are connected to a storage device, and that conduct I/O with the storage device. The management server computer generates a command for any I/O processor of the plurality of I/O processors. The management server computer encapsulates and encrypts the command to generate an encrypted message, and sends the encrypted message to the management processor. The management processor receives the encrypted message and selects an I/O processor of the plurality of I/O processors as a first address on the basis of the command. The management processor decrypts and undoes the encapsulation of the encrypted message to restore the command, and sends the command to the first address.

Advantageous Effects of Invention

The storage system of the present invention can securely communicate between the management server computer and the storage apparatus.

BRIEF DESCRIPTION OF DRAWINGS

FIG. 2 is a diagram showing a list of APIDs.
FIG. 3 is an example of an L7SW table.
FIG. 4 is an example of an exclusive control table 121.

DESCRIPTION OF EMBODIMENTS

In the following description, information in the present invention is described with representations, such as "aaa table" and "aaa list". Such pieces of information may be represented in a manner other than a data structure, such as a table or list. Thus, to represent independency of the data structure, "aaa table", "aaa list" and the like may sometimes be called "aaa information".

To describe the content of each piece of information, representations "identification information", "identifier", "name", "number" and "ID" are used. These representations can be replaced with each other.

Hereinafter, the description is sometimes made with "program" being adopted as the subject of a sentence. The program is executed by a processor, thereby performing a defined process using a memory, a communication port and a communication control device. Consequently, the description may be made with the processor being adopted as the subject of a sentence. Apart of or the entire program may be realized as dedicated hardware.

Various types of programs may be installed into a storing apparatus through a program distribution server or a computer-readable storage medium.

The present invention is not limited to Embodiment described later. This Embodiment is hereinafter described with reference to the drawings.

Figure 1:
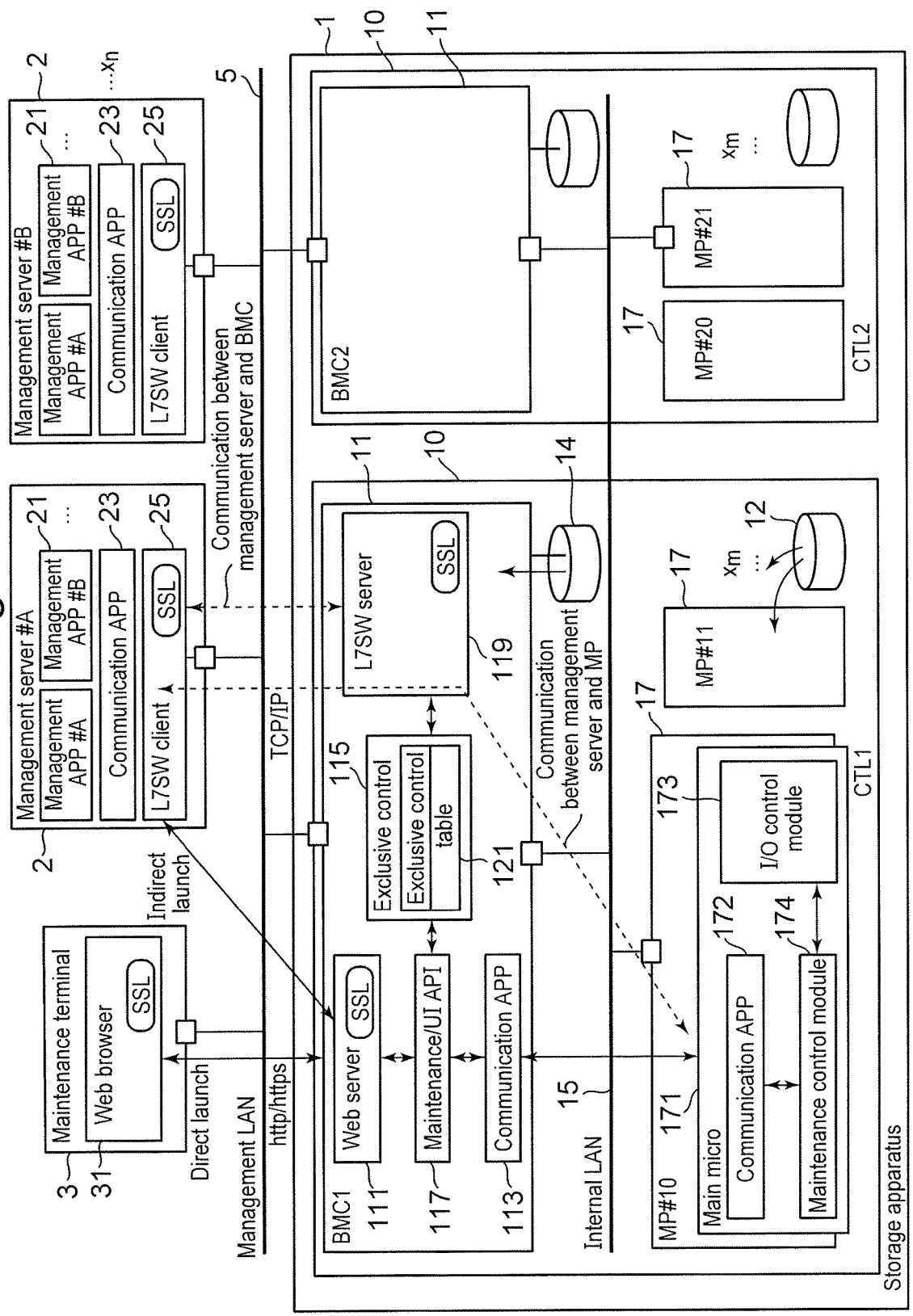
FIG. 1 is a configuration diagram of a storage system according to this Embodiment.

FIG. 1 is a configuration diagram of a storage system according to this Embodiment. The storage system of this Embodiment is a management type system that executes operations for maintaining and managing a storage apparatus 1.

The storage system includes the storage apparatus 1, multiple management server computers (hereinafter, called management servers) 2, and a maintenance terminal 3. The storage apparatus 1, the multiple management servers 2, and the maintenance terminal 3 are coupled to each other via a management LAN (first network) 5. The management LAN 5 is a network coupled through an interface (I/F), such as Ethernet (R), for example. The management servers 2 are not necessarily multiple. A single server may be adopted.

The maintenance terminal 3 is a general-purpose computer that includes a processor, a memory and a communication I/F, such as NIC (network interface card), which are not shown. The maintenance terminal 3 executes a web browser 31. The web browser 31 is coupled to a web server 111 of the storage apparatus 1 using protocols, such as http and https. SSL (Secure Sockets Layer) is used for https communication. A user or a maintenance staffer installs a program in the storage apparatus 1, sets an initial configuration, issues instructions of blocking and replacing replaceable hardware, such as FRU (Field Replaceable Unit), and obtains information pertaining to a failure or maintenance, through the web browser 31 of the maintenance terminal 3.

The management server 2 includes a processor, a memory, and a communication I/F, which are not shown. In the management server 2, the processor executes the program in the memory, thereby executing multiple management applications 21, and a communication application 23. The management server 2 executes an L7SW client 25 that uses an L7SW (Layer-7 switch) function of the storage apparatus 1. The diagram shows the multiple management applications 21 as a management APP # A, and management APP # B. Alternatively, only a single management application may be executed. Hereinafter, the communication application 23 executed in the management server 2 is sometimes called a server APP 23.

The management application 21 has functions of managing a logical device (LDEV) of the storage apparatus 1, of defining PATH, and of collecting monitor information.

The storage apparatus 1 includes redundantly configured two controllers (CTLs, control boards) 10. In this Embodiment, the number of CTLs 10 included in the storage apparatus 1 is two. The number of CTLs 10 is not limited to two. The number may be one or three or more. The configurations of the two CTLs #1 and #2 are basically analogous to each other.

Each CTL 10 includes multiple I/O processors (hereinafter called MPs: Main Processors) 13, and a management processor (hereinafter called BMC: Baseboard Management Controller) 11. The MPs 17 and the BMC 11 in each CTL 10 are coupled to each other via an internal LAN (second network) 15. The two CTLs #1 and #2 are redundantly configured through coupling via the internal LAN 15. In this example, the management processor is described as the BMC. However, the configuration is not limited thereto. The management processor may be another processor, such as a SOC (System on Chip), for example.

The internal LAN 15 is coupled through an I/F, such as Gigabit Ethernet, for example, and is a network blocked from the outside of the storage apparatus 1. On the other hand, the BMC 11 is coupled to the management LAN 5. The management servers 2 and the maintenance terminal 3 communicate with the MPs 17 via the BMC 11. The internal LAN 15 may be a high-speed communication I/F, such as PCIe (PCI Express).

The BMC 11 includes: the processor and memory, not shown, a communication I/F coupled to the management LAN 5, and a communication I/F coupled to the internal LAN 15. For example, a storage device 14, such as a flash memory ROM (FROM), is coupled to the BMC 11. The storage device 14 stores BMC firmware (BMCF/W) that is a program for maintaining and managing the storage apparatus 1, and various pieces of configuration information, such as network configuration information and authentication information.

When the storage apparatus 1 is activated, the BMCF/W is deployed in the memory of the BMC 11 and executed. The BMCF/W allows the BMC 11 to realize the web server 111, a maintenance/UI API (Application Programming Interface) 117, a communication application 113, an L7SW server 119, and an exclusive control function 115. At this time, an L7SW table 41, and an exclusive control table 121 are deployed in the memory. The communication application 113 executed in the BMC 11 is sometimes called a BMCAPP 113. Furthermore, the BMCF/W allows the BMC 11 to realize power source control of the storage apparatus 1, a remote KVM function of allowing the management server to operate the storage apparatus remotely, and a function for maintaining and managing the storage apparatus 1, such as of collecting environment information including voltage and temperature information.

The L7SW client 25 of the management server 2 and the L7SW server 119 of the BMC 11 are coupled using a TCP/IP-based socket communication protocol.

One or more storage devices 12, such as SSDs (Solid State Drives), for example, are coupled to the multiple MPs 17. The storage device 12 stores a main microprogram (main micro) 171. The MPs 17 are further coupled to a host computer, not shown, via a channel board and a network, such as SAN (Storage Area Network), which are not shown.

When the storage apparatus 1 is activated, the main micro 171 is deployed in the memory of each MP 17 and executed. The main micro 171 allows each MP 17 to realize a communication application 172, an I/O control module 173, and a maintenance control module 174. The communication application 172 executed in the MP 17 is sometimes called a MPAPP 172.

The I/O control module 173 controls the I/O with a physical storage device, not shown, in response to an I/O request issued by the host computer. The maintenance control module 174 communicates with the management application 21 of the management server 2 via the L7SW server 119 of the BMC 11. The maintenance control module 174 communicates with the maintenance terminal 3 or the management application 21 of the management server 2 via the maintenance/UI API 117 and the web server 111 of the BMC 11.

On each management server 2, the BMC 11 and each MP 17, the respective communication applications 23, 113 and 172 operate, thereby allowing communication through a common I/F between each management server 2, the BMC 11 and each MP 17. The communication applications 23, 113 and 172 perform command communication according to a command that contains an APID (Application ID) indicating a requested function. The communication between the applications 23, 113 and 172 uses handshake logic through a TCP session layer independent of APID. The command communication using the APID is communication on an application layer that is different from a TCP session and is a higher layer.

The communication between the L7SW client 25 of the management server 2 and the L7SW server 119 of the BMC 11 is called communication between the management server and BMC. The communication between management server 2 and the MP 17 via the L7W client and the L7SW server 119 is called communication between the management server and MP. Communication between the maintenance terminal 3 and the MP 17 via the maintenance/UI API 117 of the BMC 11 using http/https is called direct launch. Communication between the management application 21 of the management server 2 and the MP 17 via the maintenance UI/API 117 using the http/https is called indirect launch.

The MP 17 is not directly coupled to the management LAN 5 but is coupled to the management LAN 5 via the BMC 11. This connection allows the MP 17 to be resistant to attack from the outside of the storage apparatus 1.

The maintenance UI/API 117 is executed by the BMC 11, thereby exerting the following advantageous effects (1)-(3).

(1) An UI process, such as display on a screen of the maintenance terminal 3, can be performed independently of the I/O process of the MP 17. That is, the maintenance UI/API 117 does not use the resources of the MP 17. Consequently, reduction in I/O throughput due to the UI process and delay in response can be avoided.

(2) Even in case a failure occurs in the MP 17, the maintenance UI/API 117 can monitor and collect failure information on the MP 17.

(3) For example, when the security such as OpenSSL is required to be updated, only BMC/FW update is required. That is, the main micro is not required to be updated every time of security update. Consequently, in comparison with the case where the maintenance UI/API 117 is executed by the MP 17, adverse effects to the I/O process due to the number of main micro updates and reboot and the like during and after update.

FIG. 2 is a diagram showing a list of APIDs.

The list of APIDs is described below. The APID is an ID predefined by the communication application 23, 113 or 172, as described above. This list is stored in each management server 2, the BMC 11 and MP.

The list contains entries for the respective APIDs. Each entry contains the APID 301, a communication type 302 designating an apparatus that is the transmission-destination of a command containing the APID (hereinafter called AP command), a function 303 of the AP command, a BMC 304 that designates the CTL of the BMC used for this communication, and an APP type 305 indicating the application type of the BMC 11 that transmits an AP command to the transmission-destination MP 17.

For example, an APID 0x10 is an ID in a case where the management server 2 instructs the block-target MP 17 in the CTL 1 or 2 to block the target MP. The BMCAPP 113 transmits the AP command to the target MP. For example, an APID 0x81 is an ID in a case where the management server 2 instructs the target BMC 11 to replace the BMCF/W.

FIG. 3 is an example of an L7SW table 41.

The L7SW table 41 is a table that is stored in the memory of the BMC 11 and is updated and referred to by the L7SW server 119.

The L7SW table 41 contains entries for respective message IDs. Each entry contains a message ID 401 for identifying a message transmitted from the L7SW client 25 to the L7SW server 119, an transmission-source IP 402 that is an IP of an apparatus that is a transmission source of the message, an transmission-destination IP 403 that is an IP address of an apparatus that is a transmission destination of the message, an SSL structure pointer 404 indicating a coupling destination in a case where the message has been transmitted using SSL, a coupling status 405 indicating the coupling state, an MP number 406 of an MP included in the apparatus as the coupling destination, an FD number 407 between the management server and BMC for identifying communication between the L7SW client 25 and the L7SW server 119, and an FD number 408 between the BMC and MP that is an identifier of communication between the L7SW server 119 and the MP 17. The FD number 407 between the management server and BMC and the FD number 408 between the BMC and MP associate communication between the L7SW client 25 and the L7SW server 119 with communication between the BMC 11 and the MP 17. The communication between the L7SW client 25 and the L7SW server 119 can be identified using a message ID 501. Consequently, the L7SW table 41 is not required to be provided with a field of FD number 407 between the management server and BMC.

In this example, the transmission-source or transmission-destination apparatus is any of the maintenance terminal 3, the BMC 11 and the MP 17. The SSL structure pointer is a coupling destination in a case of transmission of an encrypted message. In the coupling status, for example, the initial state, session waiting state (listen), state of acceptance of a normal session (http) (accepted), state of acceptance of a session in SSL (https) (SSL accepted), state of waiting for close of a normal session, coupling authenticated state, state of waiting for close of a session in SSL and the like are encoded and input. For example, numeral 10 is the state waiting for a session, and numeral 30 is the state of acceptance of a session using SSL.

FIG. 4 is an example of an exclusive control table 121.

The exclusive control table 121 is a table that is stored in the memory of the BMC 11 and is updated and referred to by the maintenance/UI API 117 or the L7SW server 119. The exclusive control table 121 is a table for exclusive control for each MP 17. That is, this table 121 is used to prevent two or more AP commands from being transmitted to each MP 17.

The exclusive control table 121 contains entries for the respective MPs 17. Each entry contains an MP number 501 that is an identifier of the MP 17, a status 502 that represents the execution state of the MP, an in-entry APID 503 of the MP, an ID type 504 indicating the type of the ID that is a command request source, a request source ID 505 that represents the ID of the command, and a request source IP 506 that represents the IP address of the request source. In this embodiment, the request source ID type 504 is any of the PID (Process ID) of a process of the maintenance/UI API 117, and the message ID of the message. The case where the request source ID type 504 is the PID indicates a command through communication between the web browser 31 of the maintenance terminal 3 and the web server 111 of the BMC 11. The case where the request source ID type 504 is the message ID indicates a command through communication between the L7SW client 25 of the management server 2 and the BMC 11. The request source ID 505 indicates an ID that is any of the PID and the message ID. The request source IP 506 is an IP address that is any of the maintenance terminal 3 and the management server 2, which serve as a request source. The pieces of information that are the in-entry APID 503, the request source ID type 504, the request source ID 505, and the request source IP 506 are information for the sake of management. Consequently, the exclusive control table 121 is not necessarily provided with these fields.

Figure 5:
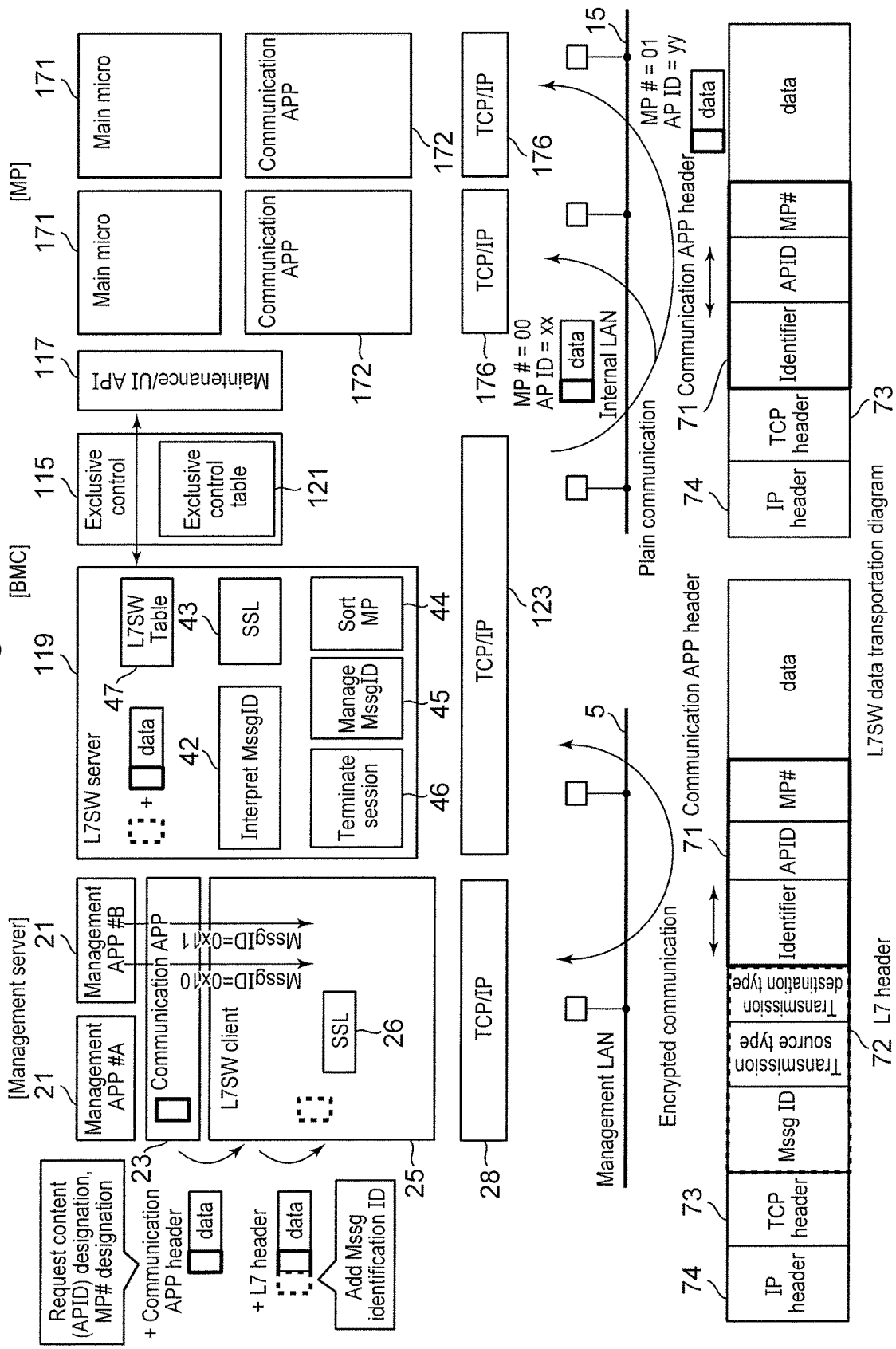
FIG. 5 is a diagram illustrating communication between a management server and an MP via an L7SW server 119.

FIG. 5 is a diagram illustrating communication between a management server and an MP via an L7SW server 119.

A case is described where the management application 21 of the management server 2 communicates with the maintenance control module 174 of the MP 17 via the L7SW server 119. When a function is called from the management application 21, the server APP 23 passes, to the L7SW client 25, an AP command where a header containing the APID indicating this function and the destination MP number (MP #) is added to data. This header is called a communication APP header 71, in the following description and diagrams. In the communication APP header 71, the identifier of the AP command is designated. As the identifier, for example, a transmission flag that indicates the start of AP command transmission, an ACK flag that is a reception response of a normal receipt of the AP command, an NAK flag that is a reception response of an abnormal receipt of the AP command, a data flag that indicates the presence of real data in the AP command, and a retransmission flag that indicates the AP command is data retransmission are designated. The MP number as the destination may be "any"; thus, the destination MP is not necessarily designated.

When the server APP 23 is called through a function call by the management application 21, the L7SW client 25 establishes a session with the L7SW server 119 according to the instruction by the server APP 23. The L7SW client 25 generates a message encapsulated by adding an L7 header 72 to the received AP command, encrypts the message by SSL 26, adds a TCP header 73 and an IP header 74, and transmits the encrypted message through the management LAN 5. In the L7 header 72, the aforementioned message ID, a transmission source type that designates the transmission-source management server 2 and management application 21, and a transmission destination type that designates the transmission-destination BMC 11 or MP 17. The L7SW client 25 may transmit a plain message as it is without encrypting the generated message.

The L7SW server 119 has a message ID interpretation function 42, a session termination function 46, a message ID management function 45, an MP sorting function 44, an L7SW table reference and update function 47, an SSL 43, and an exclusive control function 115.

After establishment of the session with the L7 client 25, the L7SW server 119 receives the encrypted message from the L7SW server 119, removes the TCP header 73 and the IP header 74, and decodes the message. Ina case where the received message is a plain message, the L7SW server 119 does not decrypt the message from which the TCP header 73 and the IP header 74 have been removed.

The L7SW server 119 updates the L7SW table 41 in the memory on the basis of information on the L7 header 72 of the message (message ID interpretation function 42). At this time, in a case where the transmission destination is an MP, the L7SW server 119 determines the destination MP (MP sorting function 44). In this case, the L7SW server 119 performs the exclusive control so as not to multiplex communication to the destination MP 17, on the basis of the exclusive control table 121 (exclusive control function 115). The exclusive control is described later.

The L7SW server 119 removes the L7 header of the message. Accordingly, the AP command is restored. Furthermore, the L7SW server 119 terminates the session with the L7SW client 25 (session termination function 46).

The L7SW server 119 adds the TCP header 73 and IP header 74 that indicate the destination MP to the decrypted AP command, and transmits the command to the destination MP via the internal LAN 15. Communication of the AP command on the internal LAN 15 is plain communication having not been encrypted. In a case where the destination MP number is not designated in the decrypted AP command, the L7SW server 119 selects the destination MP 17 through exclusive control, described later, in order to avoid multiplexing for the MP 17. The L7SW server 119 transmits the AP command that contains the MP number of the selected destination in the communication APP header 71, to the destination MP 17.

In this Embodiment, each management server 2 is provided with the L7SW client 25, and the BMC 11 is provided with the L7SW server 119. Thus, the L7SW server 119 can comprehensively accept messages based on requests issued by multiple management applications 21 in one or more management servers 2, and sort the internal AP commands to the multiple MPs. The L7SW server 119 can manage communication with the MP 17 through the AP command on a message-by-massage basis.

The L7SW client 25 (a) generates the message to which the L7 header has been added, thereby allowing communication with the L7SW server 119 using the message in which the AP command is encapsulated, on the management LAN 5. Accordingly, the format of the command can be hidden in a manner where the message is destined for the L7SW server or the like.

Furthermore, the L7SW client 25 has the SSL, thereby (b) encrypting the communication of the message to the L7SW server 119 on the management LAN 5. Consequently, the security risk from the outside of the storage apparatus 1 on the management LAN 5 can be reduced; the risk may be eavesdropping, falsification, impersonation, or DDoS (Distributed Denial of Service) attack.

On the other hand, the BMC 11 is provided with the L7SW server 119, thereby allowing use of the message to (c) complete the communication from the management server 2 to the MP 17 temporarily at the L7SW server 119 of the BMC 11. Accordingly, the following advantageous effects (d) to (f) can be exerted.

(d) The communication from the management server 2 to the MP 17 is temporarily completed at the L7SW server 119, thereby allowing the destination management application 21 to be identified by the L7 header (transmission source type) even in a case where multiple management applications 21 are executed on each management server 2. Consequently, communication through the messages can be performed from the multiple management applications 21 in an asynchronous manner, which negates the need of synchronization between the management applications 21. This also applies to a case where multiple management servers 2 are included. The L7SW server 119 can manage AP command processing based on the messages transmitted from one or more L7SW clients 25 in threads for the respective message IDs.

(e) The L7SW server 119 allows the communication between the management server and MP to be separated into a first communication between the management server 2 and the BMC 11, and a second communication between the BMC 11 and the MP 17. Accordingly, the command is encrypted in the first communication, while the command is allowed in a non-encrypted manner in the second communication. Consequently, no load due to the encryption process is not on the MP 17 performing I/O control that requires high throughput and response performance.

(f) Through the second communication, the L7SW server 119 allows communication using the AP command in which the L7 header has been removed. That is, use of the second communication separated from the first communication allows the communication between the management server and MP to be buffered temporarily in the BMC 11 and to become the second communication between the BMC 11 and the MP 17. This configuration reduces the opportunities of directly transmitting and receiving the command between the management server and MP (including handshake and communication on the TCP layer), thereby avoiding restriction to the bandwidth of the management LAN 5 between the management server 2 and the BMC 11. Even in case a communication failure occurs in the management LAN 5, it is only required that the second communication is performed between the BMC and MP via the internal LAN 15 for the AP command processing based on the message received by the BMC 11. Accordingly, it becomes resistant to the adverse effects of the failure on the management LAN 5 side.

(g) For example, in some cases, the management server 2 intends to access information in the BMC 11. In such cases, the communication can be completed only with communication between the management server and BMC using the message. The BMC 11 stores, for example, network setting information, authentication information and the like.

Figure 6:
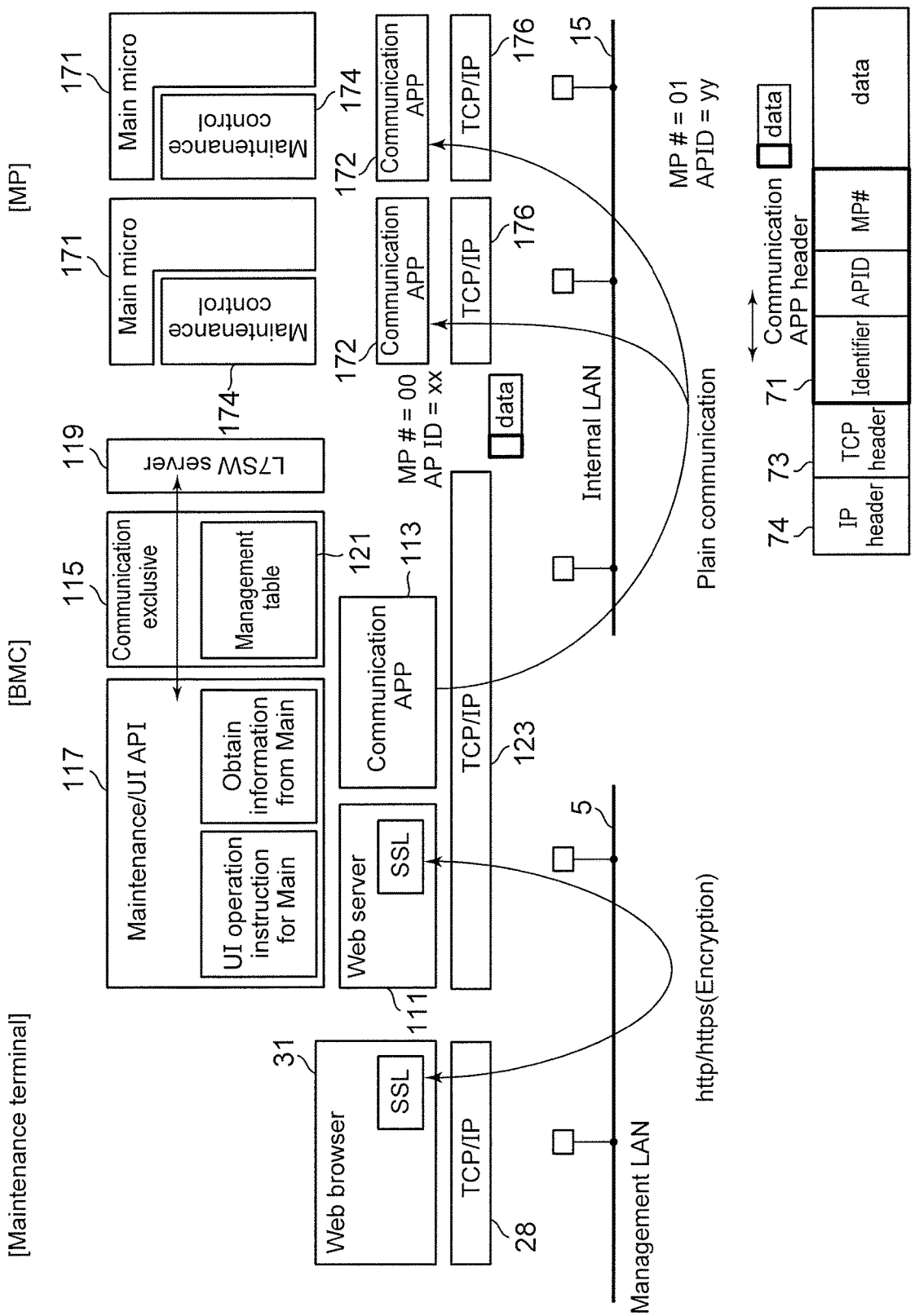
FIG. 6 is a diagram illustrating direct launch.

FIG. 6 is a diagram illustrating direct launch.

The maintenance/UI API 117 in the BMC 11 provides screen display information for the web browser 31 via the web server 111. The maintenance/UI API 117 transmits the AP command to the maintenance control module 174 in the main micro 171 and obtains information from the maintenance control module 174, on the basis of an access from the web browser 31. More specifically, for example, the maintenance/UI API 117 obtains the configuration information on the storage apparatus 1 and monitor information on the state, and issues a block instruction for maintenance and replacement target components.

For example, the web browser 31 establishes a session using http or https (encrypted) with the web server 111. The maintenance/UI API 117 is activated by any of direct and indirect launch methods. According to the direct launch, the web browser 31 activates the maintenance/UI API 117 via the web server 111. According to the indirect launch, the management application 21 of the management server 2 activates the maintenance/UI API 117 via the web server 111.

In a case where the web browser 31 issues a request to the maintenance/UI API 117, the maintenance/UI API 117 generates the APID based on the request and the AP command that designates the destination MP 17. The AP command is hereinafter called a maintenance side AP command. The BMCAPP 113 then executes communication exclusive control, subsequently adds the TCP header and IP header that designate the MP having the MP number designated in the communication APP header 71 to the maintenance side AP command, and transmits the command to the destination MP via the internal LAN 15. On the internal LAN 15, the communication is plain communication having not been encrypted.

The maintenance control module 174 has functions of I/F for communication between the maintenance/UI API 117 and the main micro 171; the functions include schedule management of maintenance control, such as block and recovery instructions, and reference and update of the configuration information, on the main micro 171 side. Consequently, an operation for maintaining and controlling the storage apparatus 1 can be performed from the maintenance terminal 3 or the management server (in the case of indirect launch) 21 to the MP 17.

The maintenance/UI API 117 transmits the AP command to the MP 17, subsequently waits for the response, and transmits the next AP command to the MP 17. That is, the AP command from the maintenance/UI API 117 to each AP command is not multiplexed. However, the AP command is transmitted from the L7SW server 119 to each MP 17. Consequently, the maintenance/UI API 117 performs exclusive control for communication with each MP through the exclusive control function 115.

According to the indirect launch, the management application 21 accesses the maintenance/UI API 117 via the web server 111, thereby allowing information, such as screen display information, to be obtained. Consequently, even without implementation of a function equivalent to that of the maintenance/UI API 117 in the management server 2, the management application 21 can use the function of the maintenance/UI API 117.

Figure 7:
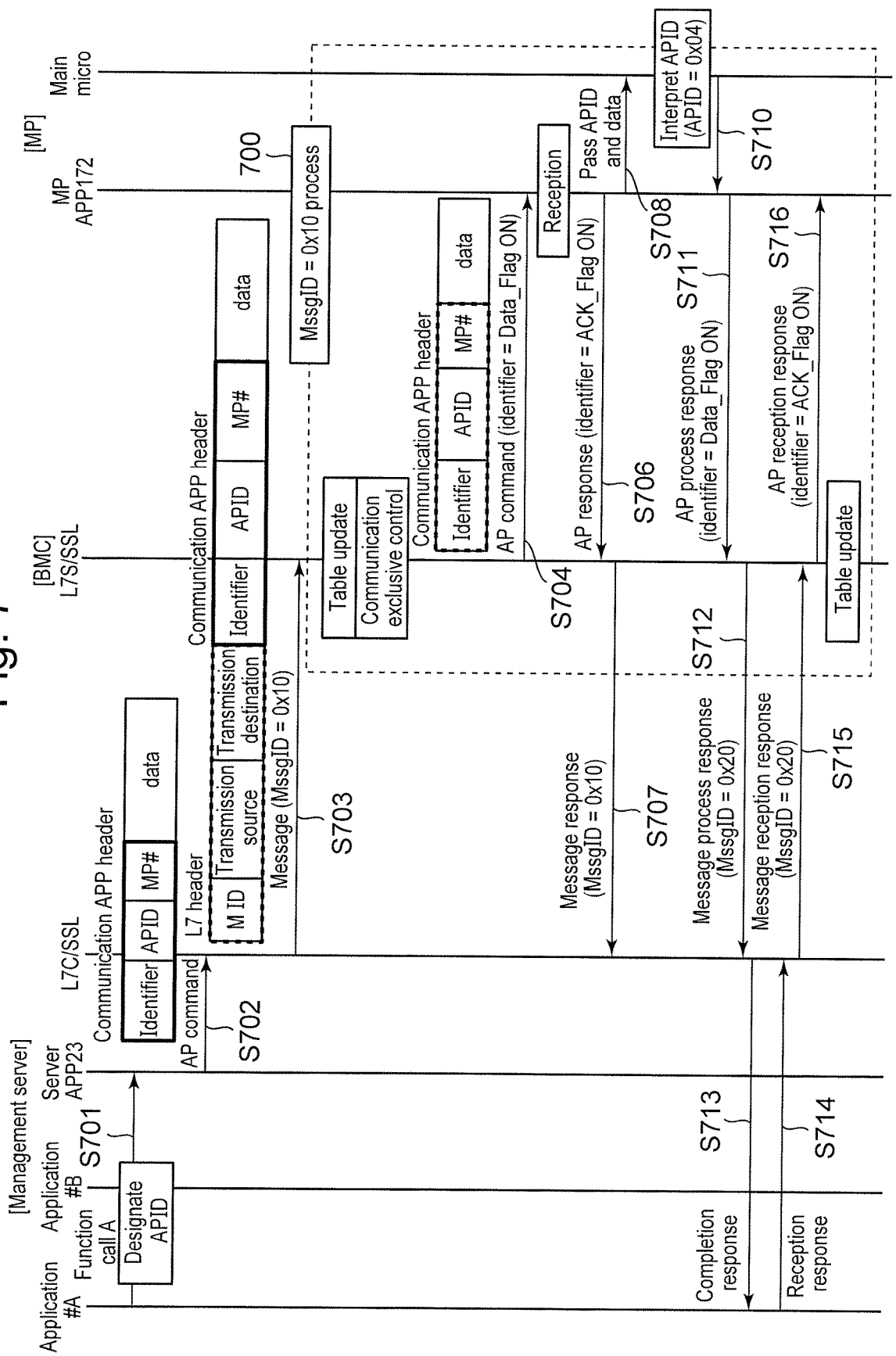
FIG. 7 is a part of a sequence diagram showing an example of the communication between the management server and MP.
Figure 8:
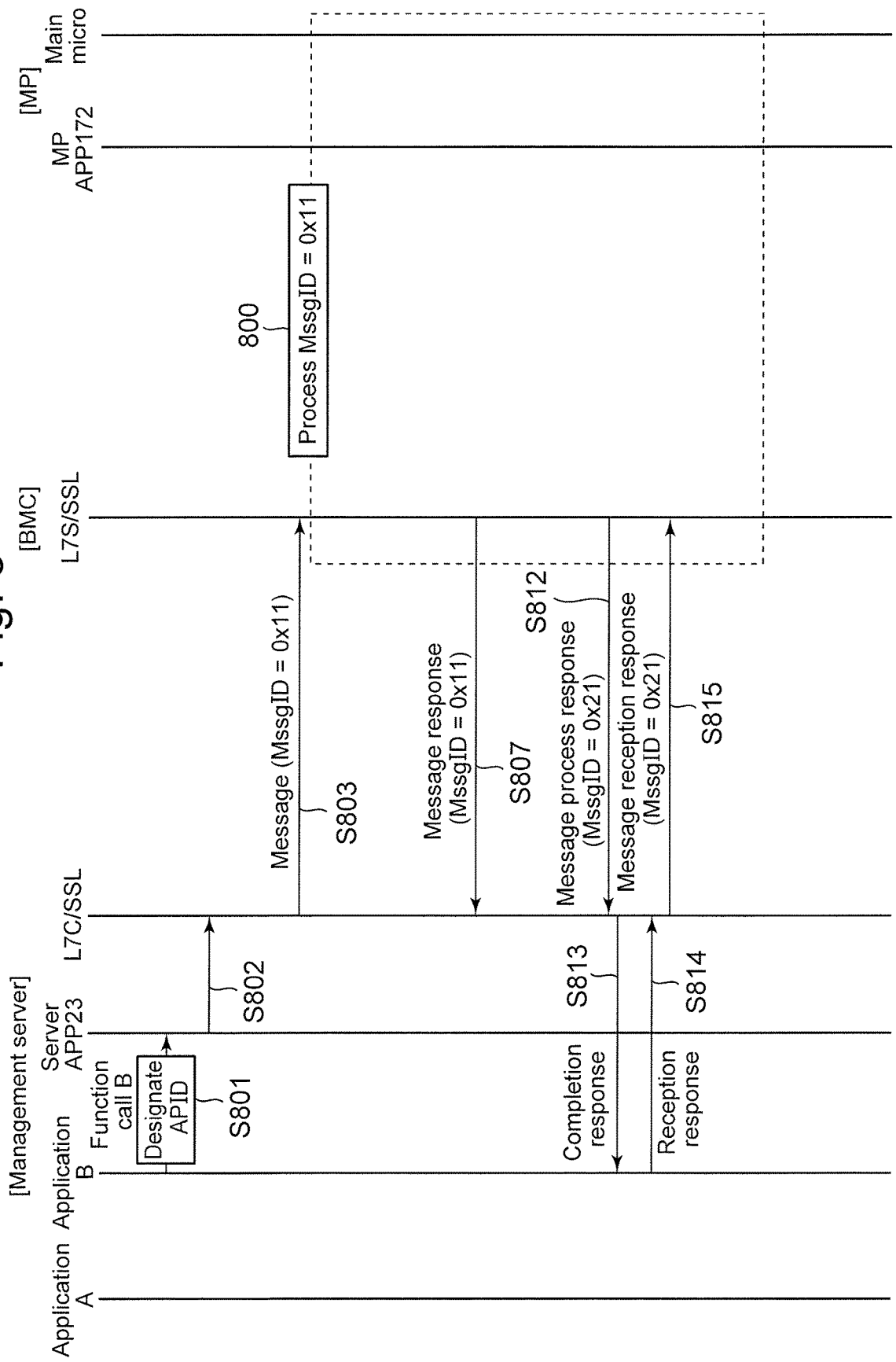
FIG. 8 is another part of the sequence diagram showing the example of the communication between the management server and MP.

FIG. 7 is a part of a sequence diagram showing an example of the communication between the management server and MP. FIG. 8 is another part of the sequence diagram showing an example of the communication between the management server and MP.

The communication is started when the management application 2 calls a function that indicates a request for a process of the MP 17. The management application # A calls a function A of the server APP 23 (function callA) (S701).

The server APP 23 designates the APID associated with the function A, adds the communication APP header 71 containing the APID and the destination MP number to the data, and generates the AP command. The server APP 23 passes the AP command to the L7SW client 25 (S702).

The L7SW client 25 establishes SSL or a normal session with the L7SW server 119. The L7SW client 25 adds the L7 header 72 that contains the new message ID (0x10), the transmission source type and the transmission destination type to the AP command, encrypts the command, and generates a message (in a plain message as it is in the case of the normal session). The L7SW client 25 transmits the message to the L7SW server 119 (S703). The L7SW client 25 generates message IDs different among the sessions with the L7SW server 119.

The L7SW server 119 receives the message, and manages a thread based on the message ID (0x10) in the message (700). The thread with the message ID 0x10 is indicated by broken lines. The L7SW server 119 updates the L7SW table 41 and the exclusive control table 121 on the basis of the message, executes exclusive control, and selects the MP that is the destination of the AP command. The details of the exclusive control are described later.

The L7SW server 119 decodes the message and removes the L7 header, thereby restoring the AP command. In this example, the AP command contains an identifier (Data Flag ON) that means the presence of real data. The L7SW server 119 transmits the AP command to the MPAPP 172 (S704).

The MPAPP 172 receives the AP command, and transmits a reception response to the L7SW server 119 (S706). In this example, the AP header of the reception response of the AP command (AP response) contains an identifier (ACK Flag ON) that indicates a normal response.

The L7SW server 119 receives the AP response, and transmits a message reception response (message response) to the L7SW client 25 (S707). A message ID 0x10 that is the same as the corresponding message is added to the message response.

The MPAPP 172 passes the APID and data in the AP command received in S704 to the main micro 171 (S708).

The main micro 171 interprets the APID, and executes a process based on the request. In this example, the APID is 0x04. Consequently, the main micro 171 refers to the configuration information, and executes a process of returning information (see FIG. 2).

After completion of the process, the main micro 171 passes a result of the process based on the AP command to the MPAPP 172 (S710).

The MPAPP 172 obtains the result of the process from the main micro 171, generates an AP process response on the basis of the result, and transmits the AP process response to the L7SW server 119 (S711). The AP process response is transmitted in the format of the AP command where the communication APP header 71 is added to the data that is the result. In this example, the AP header of the AP process response contains an identifier (Data Flag ON) that means the presence of real data.

The L7SW server 119 receives the AP process response, generates a message process response on the basis of the AP process response, and transmits a message process response to the L7SW client 25 (S712). The message process response is generated by adding the L7 header to the AP process response. The L7 header contains a message ID related to the message ID contained in the message of the process request. More specifically, in this example, 0x10 is added to the process request message ID 0x10 to obtain 0x20.

The L7SW client 25 receives the message process response, and notifies the management application # A of the result of the request based on the function A and of a completion response (S713).

The management application # A receives the result and the completion response, and notifies the L7SW client 25 of the reception response of the completion response (S714).

The L7SW client 25 receives the reception response, and transmits a message reception response where the L7 header is added to the reception response, to the L7SW server 119 (S715). The message reception response contains the message ID (0x20) identical to that of the message process response.

The L7SW server 119 receives the message reception response, updates the L7SW table 41 and the exclusive control table 121 on the basis of the message reception response, and transmits an AP reception response where the L7 header has been removed from the message reception response, to the MPAPP 172 (S716). The MPAPP 172 receives the AP reception response, and finishes communication based on the response of the function A.

FIG. 8 is described below. Here, a case is described where the management application # B calls a function B of the server APP 23 (function callB) (S801). The server APP 23 designates the APID associated with the function B, adds the communication APP header 71 containing the APID and the destination MP number to the data, and generates the AP command. The server APP 23 passes the AP command to the L7SW client 25 (S802).

The communication between the management application # B and the MP 17 in this case is basically analogous to the communication between the management application # A and the MP 17. However, the message ID of the message generated by the L7SW client 25 on the basis of the request is different (S803). The message ID 0x11 is added to this message. The L7SW server 119 manages the communication with the main micro 171 through a thread based on the message ID (0x11) of the message (800). The thread with the message ID 0x11 indicated by broken lines is basically analogous to the thread with the message ID 0x10.

The message ID 0x11 identical to that of the message is added to the message response to be transmitted by the L7SW server 119 to the L7SW client 25.

The L7 header of each of the responses of process and reception of the message between the L7SW server 119 and the L7SW client 25 contains the message-related message ID (0x21) of the message (S812 and S815).

In the communication described above, with respect to one request issued by the management application 21 to the main micro 171, the L7SW client 25 generates a message where the L7 header 71 contains the message ID. Accordingly, the communication between the L7SW server 119 and the main micro 171 through the AP command where the L7 header has been removed can be subjected to thread management using the message ID. Consequently, even when multiple messages are transmitted from the L7 client 25, the L7SW server 119 can manage the communication on a message-by-message basis. FIGS. 7 and 8 show the message 0x10 and 0x11 communication threads in a serial manner. Alternatively, the multiplexed process can be performed as described above.

Figure 9:
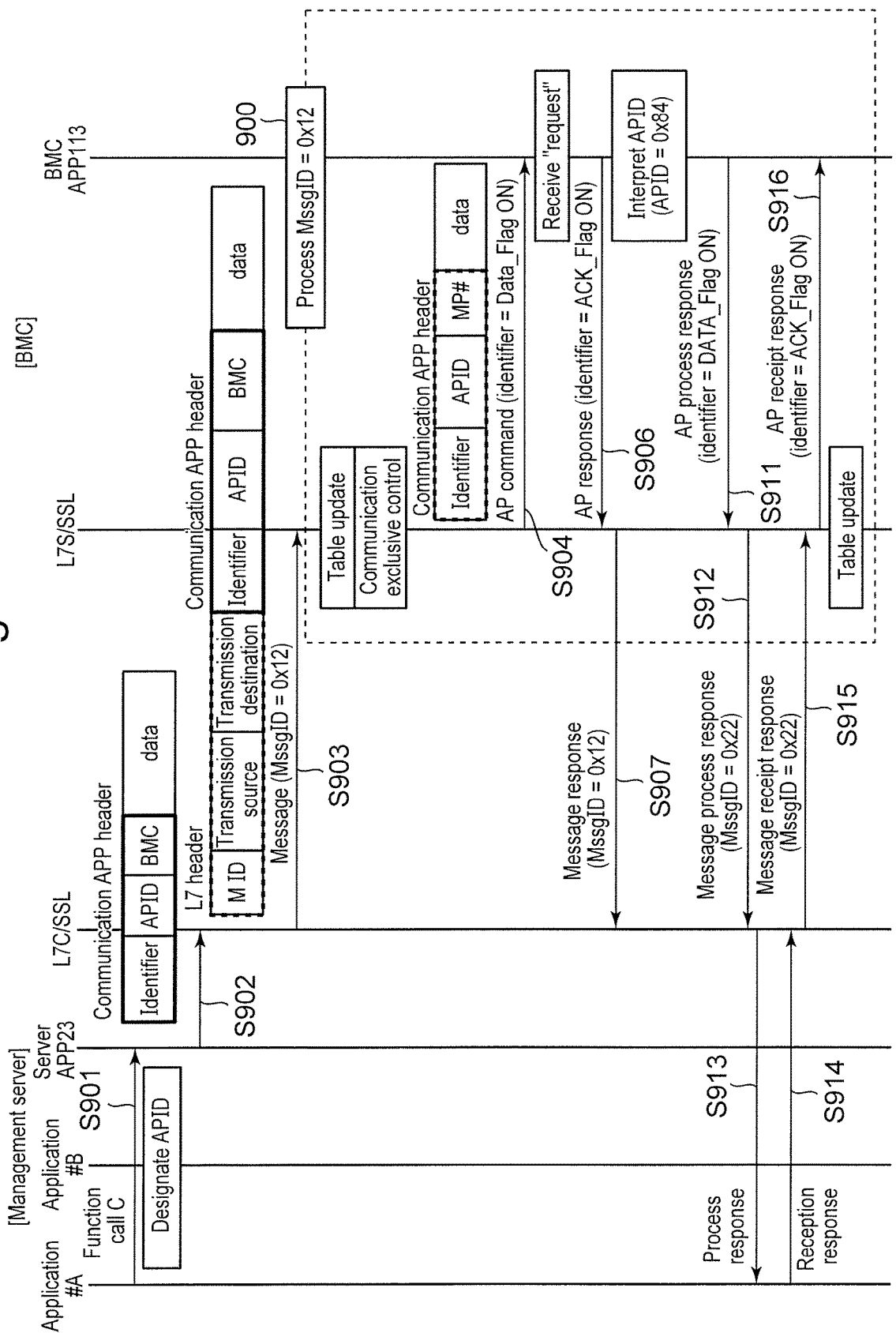
FIG. 9 is a part of the sequence diagram showing an example of communication between the management server and BMC.
Figure 10:
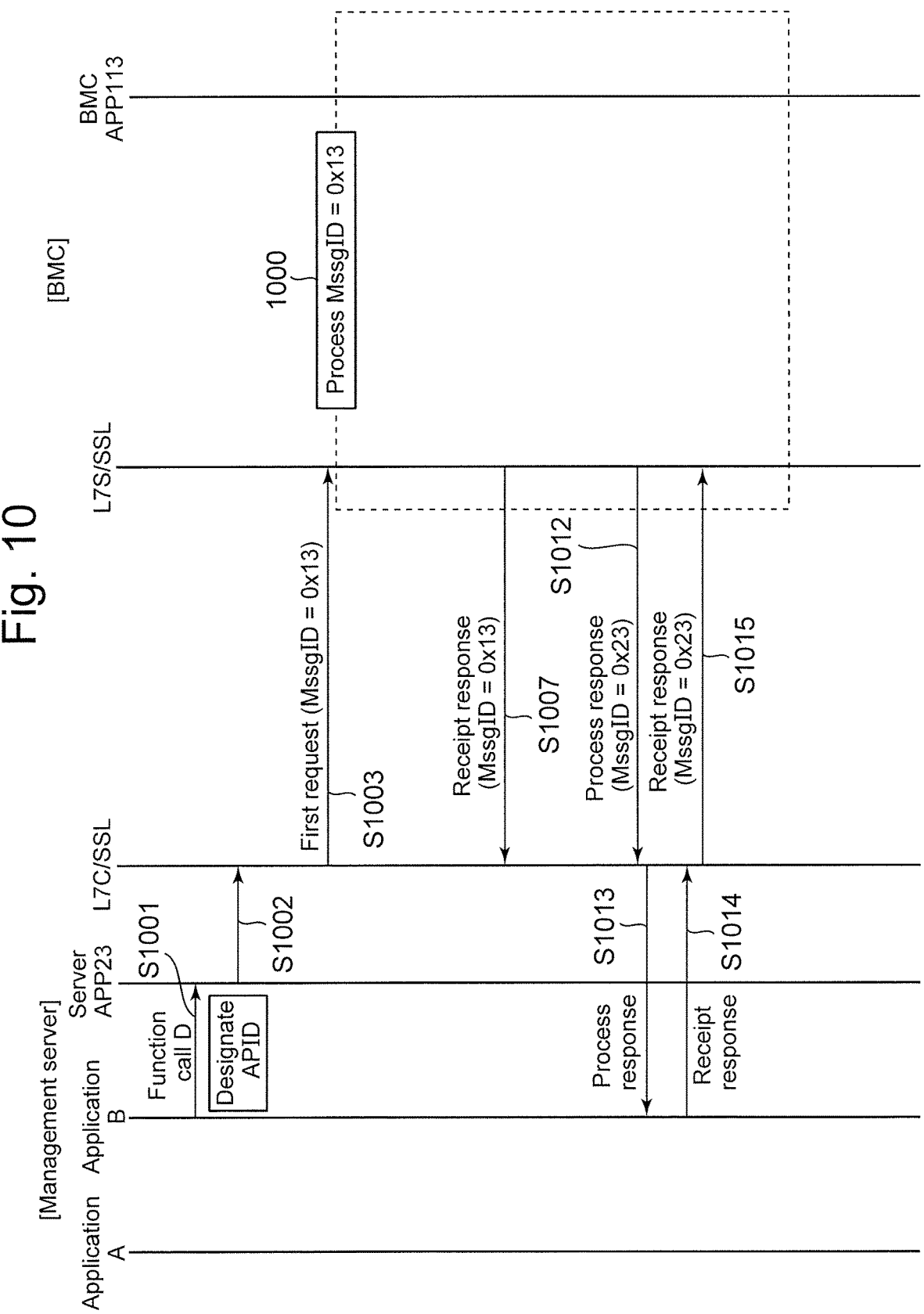
FIG. 10 is another part of the sequence diagram showing the example of the communication between the management server and BMC.

FIG. 9 is a part of the sequence diagram showing an example of communication between the management server and BMC. FIG. 10 is another part of the sequence diagram showing the example of the communication between the management server and BMC.

The communication is started when the management application 2 calls a function that indicates a request for a process to be completed within the BMC 11. The management application # A calls a function C of the server APP 23 (function callC) (S901).

The server APP 23 designates the APID associated with the request C, adds, to the data, the APID and the communication APP header 71 destined for the BMC 11, and generates the AP command. The server APP 23 passes the AP command to the L7SW client 25 (S902).

The L7SW client 25 establishes a session with the L7SW server 119. The L7SW client 25 adds the L7 header 72 that contains the new message ID (0x12), the transmission source type and the transmission destination type to the AP command, and generates a message. The L7SW client 25 transmits the message to the L7SW server 119 (S903).

The L7SW server 119 receives the message, and manages a thread based on the message ID (0x12) in the message (900). The thread with the message ID 0x12 is indicated by broken lines. The L7SW server 119 updates the L7SW table 41 on the basis of the message.

The L7SW server 119 removes the L7 header of the message, and generates the AP command. In this example, the AP command contains an identifier (Data Flag ON) that means the presence of real data. The L7SW server 119 transmits the AP command to the BMCAPP 113 (S904).

The BMCAPP 113 receives the AP command, and transmits a reception response to the L7SW server 119 (S906). In this example, the AP header of the reception response of the AP command (AP response) contains an identifier (ACK Flag ON) that indicates a normal response.

The L7SW server 119 receives the AP response, and transmits a message reception response (message response) to the L7SW client (S907). A message ID 0x12 that is the same as that of the corresponding message is added to the message response.

The BMCAPP 113 interprets the APID, and executes a process based on the request. In this example, the APID is 0x84. Consequently, the BMCAPP 113 refers to the BMC configuration information, and executes a process of returning information (see FIG. 2).

After completion of the process, the BMCAPP 113 generates an AP process response on the basis of the result of the process based on the AP command, and transmits the AP process response to the L7SW server 119 (S911). The AP process response is transmitted in the format of the AP command where the communication APP header 71 is added to the data that is the result. In this example, the AP header of the AP process response contains an identifier (Data Flag ON) that means the presence of real data.

The L7SW server 119 receives the AP process response, generates a message process response on the basis of the AP process response, and transmits a message process response to the L7SW client 25 (S912). The message process response is generated by adding the L7 header to the AP process response. The L7 header contains a message ID related to the message ID contained in the message of the process request. More specifically, in this example, 0x10 is added to the process request message ID 0x12 to obtain 0x22.

The L7SW client 25 receives the message process response, and notifies the management application # A of the result of the request based on the function C and a completion response (S913).

The management application # A receives the result and the completion response, and notifies the L7SW client 25 of the reception response of the completion response (S914).

The L7SW client 25 receives the reception response, and transmits a message reception response where the L7 header is added to the reception response, to the L7SW server 119 (S915). The message reception response contains the message ID (0x22) identical to that of the message process response.

The L7SW server 119 receives the message reception response, updates the L7SW table 41 on the basis of the message reception response, and transmits an AP reception response where the L7 header has been removed from the message reception response, to the BMCAPP 113 (S916). The BMCAPP 113 receives the AP reception response, and finishes communication based on the response of the function C.

FIG. 10 is described below. Here, a case is described where the management application # B calls a function D of the server APP 23 (function callD) (S1001). The server APP 23 designates the APID associated with the request D, adds, to the data, the APID and the communication APP header 71 destined for the BMC 11, and generates the AP command. The server APP 23 passes the AP command to the L7SW client 25 (S1002).

The communication between the management application # B and the BMC 11 in this case is basically analogous to the communication between the management application # A and the BMC 11. However, the message ID of the message generated by the L7SW client 25 on the basis of the request is different (S1003). The message ID 0x13 is added to this message. The L7SW server 119 manages the communication with the BMCAPP 113 through a thread based on the message ID (0x13) of the message (1000). The thread with the message ID 0x13 indicated by broken lines is basically analogous to the thread with the message ID 0x12 in FIG. 9.

The message ID 0x13 identical to that of the message is added to the message response to be transmitted by the L7SW server 119 to the L7SW client 25.

The L7 header of each of the responses of process and reception of the message between the L7SW server 119 and the L7SW client 25 contains the message-related message ID (0x23) of the message (S1012 and S1015).

In the communication described above, even when the management application 21 issues a request to the BMC 11, the L7SW client 25 generates a message where the L7 header 71 contains the message ID, as with the case of the request issued to the MP 17. Accordingly, the communication between the L7SW server 119 and the BMCAPP 113 through the AP command where the L7 header has been removed can also be managed through the thread of the message ID. That is, the L7SW server 119 can manage multiple messages from the L7 client 25 irrespective of the destinations on a message-by-message basis. FIGS. 9 and 10 show the message 0x12 and 0x13 communication threads in a serial manner. Alternatively, the multiplexed process can be performed as described above.

Figure 11:
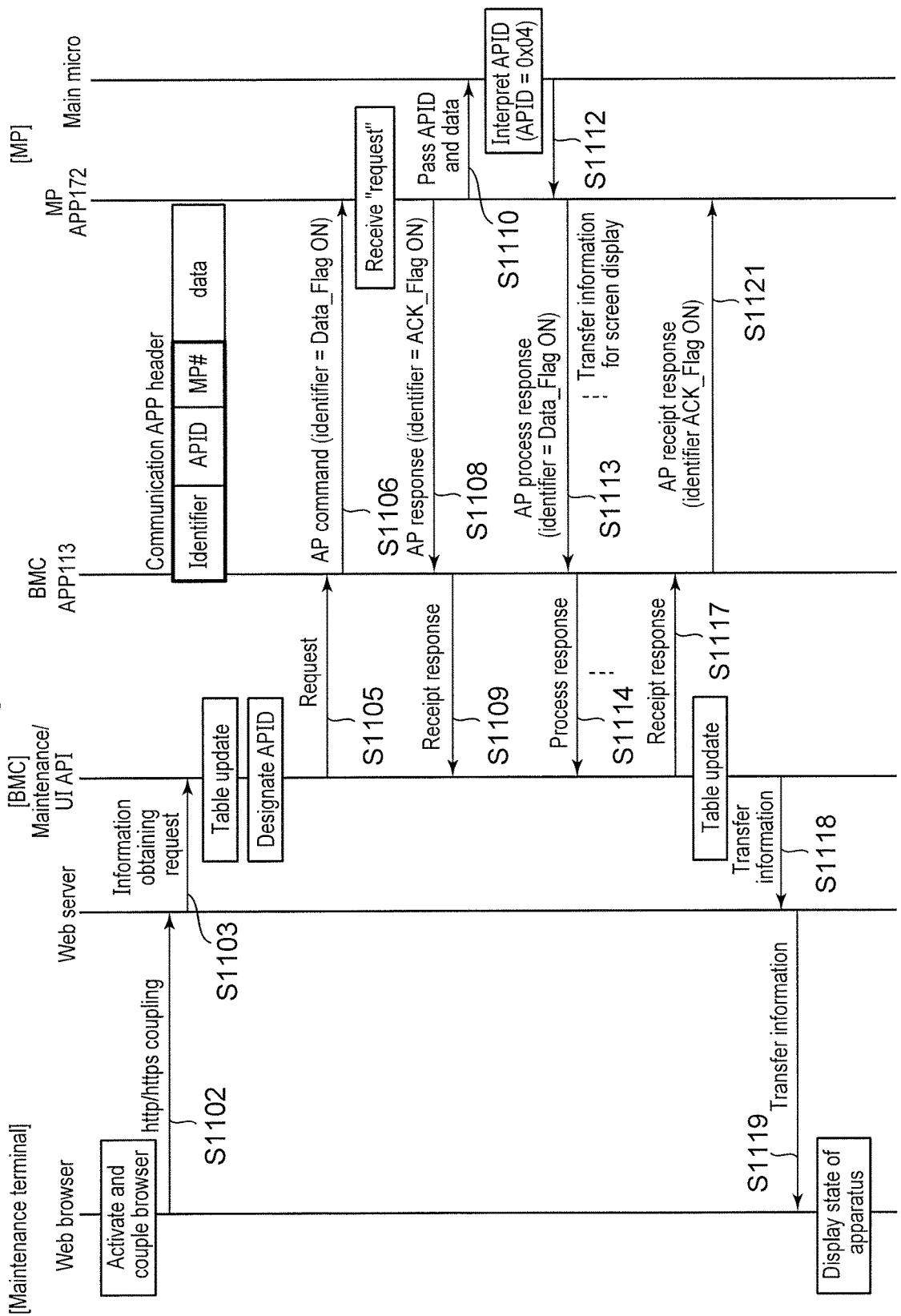
FIG. 11 is a sequence diagram showing an example of communication between a maintenance terminal and MP.

FIG. 11 is a part of a sequence diagram showing an example of communication between a maintenance terminal and MP.

When the maintenance terminal 3 activates the web browser 31, the web browser 31 is coupled to the web server 111 (http/https coupling) (S1102).

The web server 111 transmits, to the maintenance/UI API 117, a request for obtaining screen display information as a request (S1103). The maintenance/UI API 117 updates the exclusive control table 121, executes the exclusive control on the basis of the request for obtaining, and selects the destination MP. The details of the exclusive control are described later. The maintenance/UI API 117 designates the APID based on the request for obtaining, and passes the APID to the BMCAPP 113 (S1105).

The BMCAPP 113 adds the communication APP header 71 containing the APID and the destination MP number to the data, and generates the AP command. The BMCAPP 113 transmits the AP command to the MPAPP 172 of the destination MP (S1106). In this example, the AP command contains an identifier (Data Flag ON) that means the presence of real data.

The MPAPP 172 receives the AP command, and transmits a reception response to the BMCAPP 113 (S1108). In this example, the AP header of the reception response of the AP command (AP response) contains an identifier (ACK Flag ON) that indicates a normal response.

The BMCAPP 113 receives the AP response, and passes the reception response to the request for obtaining to the maintenance/UI API 117 (S1109).

The MPAPP 172 passes the APID and data to the main micro 171 (S1110).

The main micro 171 interprets the APID, and executes a process based on the request. In this example, the APID is 0x04. Consequently, the main micro 171 executes a process of referring to the configuration information (see FIG. 2). After completion of the process, the main micro 171 passes a result of the process based on the AP command to the MPAPP 172 (S1112).

The MPAPP 172 obtains screen display data as the result of the process from the main micro 171, generates an AP process response on the basis of the data, and transmits the AP process response to the BMCAPP 113 (S1113). The AP process response is transmitted in the format of the AP command where the communication APP header 71 is added to the data that is the result. In this example, the AP header of the AP process response contains an identifier (Data Flag ON) that means the presence of real data. The AP process response is subjected to data division according to the amount of screen display data, and is transmitted.

The BMCAPP 113 receives the AP process response, and passes the process response from which the communication APP header 71 has been removed, to the maintenance/UI API 117 (S1114). The process response is subjected to data division according to the amount of screen display data, and is passed.

The maintenance/UI API 117 obtains the process response, and passes the reception response to the BMCAPP 113 (S1117). The BMCAPP 113 transmits, to the MPAPP 172, the AP reception response where the data communication APP header is added to the reception response (S1121). In this example, the AP header of the AP reception response contains an identifier (ACK Flag ON) that indicates a normal response.

The maintenance/UI API 117 updates the exclusive control table on the basis of the process response, and transmits the screen display data to the web server 111 (S1118).

The web server 111 transmits the screen display data to the web browser 31 (S1119). The state of the apparatus is thus displayed on the web browser 31.

According to the process described above, even in a case of a direct operation by the user or maintenance staffer through the web browser 31, information on the MP 17 can be obtained via the maintenance UI/UIAPI 117 of the BMC 110. Here, the maintenance UI/UIAPI 117 is accessed from the web browser 31 of the maintenance terminal 3 via the web server 111 (direct launch). Alternatively, the maintenance UI/API 117 may be accessed through the management application (indirect launch).

Figure 12:
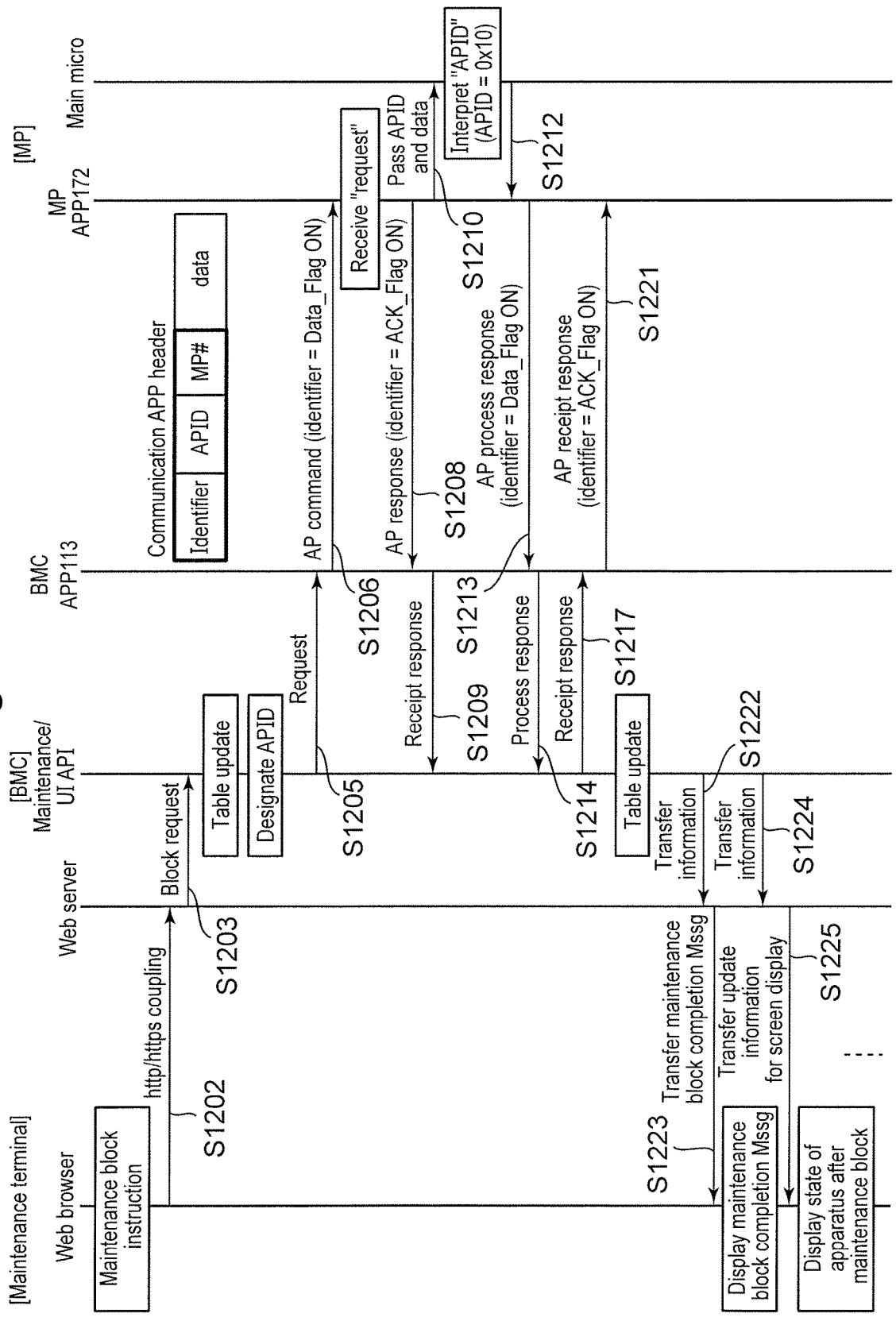
FIG. 12 is a sequence diagram showing another example of communication between the maintenance terminal and MP.

FIG. 12 is a sequence diagram showing another example of communication between a maintenance terminal and MP.

When the maintenance terminal 3 activates the web browser 31, the web browser 31 is coupled to the web server 111 (http/https coupling) (S1202). The user issues, through the web browser, an instruction of blocking the MP (target MP) on the control board where a failure occurs (maintenance block instruction).

The web server 111 passes a request for blocking the target MP to the maintenance/UI API 117 on the basis of the maintenance block instruction (S1203). The maintenance/UI API 117 updates the exclusive control table 121 on the basis of the request for obtaining. The update of the table 121 is prohibition of entry of the target MP. The maintenance/UI API 117 passes the request for obtaining to the BMCAPP 113 (S1205).

The BMCAPP 113 designates the APID based on the request for obtaining, adds the communication APP header 71 containing the APID and the target MP number to the data, and generates the AP command. The BMCAPP 113 transmits the AP command to the MPAPP 172 of the target MP (S1206). In this example, the AP command contains an identifier (Data Flag ON) that means the presence of real data.

The MPAPP 172 receives the AP command, and transmits a reception response to the BMCAPP 113 (S1208). In this example, the AP header of the reception response of the AP command (AP response) contains an identifier (ACK Flag ON) that indicates a normal response.

The BMCAPP 113 receives the AP response, and passes the reception response to the request for obtaining to the maintenance UI API 117 (S1209).

The MPAPP 172 passes the APID and data to the main micro 171 (S1210).

The main micro 171 interprets the APID, and executes a process based on the request. In this example, the APID is 0x10. Consequently, the main micro 171 executes its own blocking process, and passes the result to the MPAPP 172 (S1212).

The MPAPP 172 obtains a block completion notification that is the result of the process, from the main micro 171, generates an AP process response on the basis of the notification, and transmits the AP process response to the BMCAPP 113 (S1213). The AP process response is transmitted in the format of the AP command where the communication APP header 71 is added to the data (block completion notification) that is the result. In this example, the AP header of the AP process response contains an identifier (Data Flag ON) that means the presence of real data. The block process here is a block process for an I/O control module, and is an example that allows the AP process response to be returned. In some cases of a process of blocking the entire MP 17, the AP process response is not returned.

The BMCAPP 113 receives the AP process response, and passes the process response from which the communication APP header 71 has been removed, to the maintenance/UI API 117 (S1214).

The maintenance/UI API 117 receives the process response, and passes the reception response to the BMCAPP 113 (S1217). The BMCAPP 113 transmits, to the MPAPP 172, the AP reception response where the data communication APP header is added to the reception response (S1221). In this example, the AP header of the AP reception response contains an identifier (ACK Flag ON) that indicates a normal response.

The maintenance/UI API 117 updates the exclusive control table on the basis of the process response, and passes and transmits the block completion notification on the target MP, to the web server 111 (S1222).

The web server 111 causes the web browser 31 to display that the target MP blocking has been completed (S1223) (transfer a maintenance block completion Mssg).

The maintenance/UI API 117 transmits the screen display data (update information) to the web server 111 on the basis of the process response (S1224). The web server 111 transmits the screen display data (update information) to the web browser 31 (S1225). The state of the apparatus after the target MP has been blocked is thus displayed on the web browser 31.

According to the process described above, even in a case of a direct operation by the user or maintenance staffer through the web browser 31 of the maintenance terminal 3 (direct launch), the MP 17 on the failing control board can be blocked and the state of the apparatus thereafter can be obtained via the maintenance UI/UIAPI 117 of the BMC 110. Here, the maintenance UI/UIAPI 117 is accessed from the web browser 31 of the maintenance terminal 3 via the web server 111. Alternatively, the maintenance UI/API 117 may be accessed through the management application (indirect launch).

Figure 13:
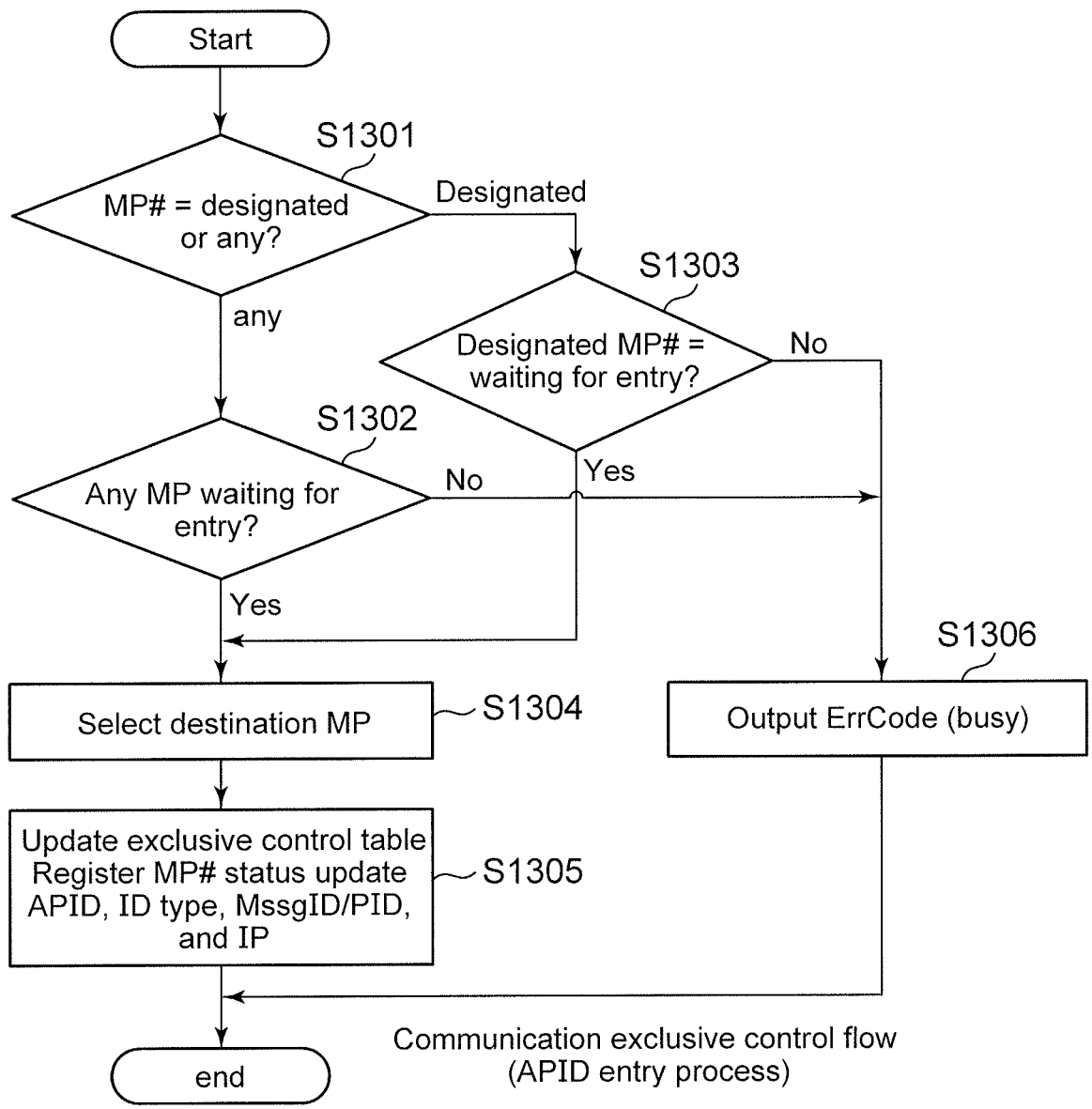
FIG. 13 is an example of a flowchart of exclusive control.

FIG. 13 is an example of a flowchart of exclusive control.

This process is a process executed by each part (the L7SW server 119 or the maintenance/UI API 117) of the BMC 11 having received the request issued to the MP 17. In this Embodiment, when the L7SW server 119 receives a message from the L7SW client 25 or when the maintenance/UI API 117 receives a request issued by the user via the web server 111, this process determines the MP for which the request destined. Description is hereinafter made with the subject of the process being the BMC 11.

The BMC 11 determines whether request-target MP is designated or not (S1301). In a case where the request-target MP is designated (S1301; designated), the BMC 11 determines the status of the designated MP on the basis of the exclusive control table 121 (S1303). In cases other than a case where the status of the designated MP is that of waiting for the entry, that is, a case of in-execution or entry prohibited, the BMC 11 passes an error code to the BMCAPP 113 (S1306) and finishes the process.

On the contrary, in a case where the request-target MP is not designated (S1301; any), the BMC 11 determines whether there is any MP in the status of "waiting for the entry" or not on the basis of the exclusive control table 121 (S1302). In a case where there is no MP "waiting for the entry" (S1302; No), the BMC 11 passes the error code to the BMCAPP 113 (S1306) and finishes the process.

In a case where there is any MP "waiting for the entry" (S1302; Yes), the BMC 11 selects one MP waiting for the entry as the destination MP (S1304). The BMC 11 then updates the exclusive control table 121 on the basis of the selected destination MP, and finishes the process (S1305). More specifically, the BMC 11 sets the status 502 of the destination MP to the "in-execution", designates the APID contained in the AP command to be transmitted by this BMC into the in-entry ID 503, and designates the request source ID type 504, the request source ID 505 and the request source IP 506 according to the request. As described above, the in-entry APID 503, the request source ID type 504, the request source ID 505 and the request source IP 506 are pieces of information for the sake of management. Consequently, the BMC 11 does not necessarily designate these pieces.

When no destination MP is designated in the request, the process described above can designate the enterable MP as the destination MP. Also when the destination MP is designated in the request, it can be determined whether the destination MP is in an enterable state or not. According to such a configuration, even when multiple requests have been received, the L7SW server 119 of the BMC to sort the requests efficiently for the MPs.

In cases where there are instructions without designation of the destination MP in the direct launch and indirect launch, the enterable MP can be designated as the destination MP. When the destination MP is designated in the instruction, it can be determined whether the destination MP is in the enterable state or not.

The present invention is not limited to this Embodiment. It is a matter of course that the present invention can be variously modified in a range without departing from the gist.

REFERENCE SIGNS LIST

1: Storage apparatus, 2: Management server, 3: Maintenance terminal, 5: Management LAN, 10: Controller, 11: BMC, 15: Internal LAN, 17: Main processor

The invention claimed is:
1. A storage system, comprising: a management server computer; and a storage apparatus,
wherein the storage apparatus includes:
a management processor coupled to the management server computer via a first network; and
a plurality of I/O processors that are coupled to the management processor via a second network, and are coupled to a storage device and are configured to execute I/O to the storage device,
wherein the management server computer is configured to generate a command for any I/O processor among the plurality of I/O processors,
wherein the management server computer is configured to encapsulate and encrypt the command to generate an encrypted message, and to transmit the encrypted message to the management processor,
wherein the management processor is configured to receive the encrypted message, decrypt and decapsulate the encrypted message to restore the command, to select an I/O processor among the plurality of I/O processors as a first destination based on the command, and to transmit the command to the first destination,
wherein when the management server computer designates a first I/O processor among the plurality of I/O processors in the command, the management processor selects the first processor designated in the command as the first destination,
wherein the management processor is configured to store state information that indicates states of the plurality of I/O processors,
wherein the management processor is configured to determine whether or not the first I/O processor is in a state of waiting for an entry where the first I/O processor is capable of accepting a process, based on the state information,
wherein the management processor is configured to transmit the command to the first I/O processor when the first I/O processor is in the state of waiting for the entry,
wherein when the management server computer designates no I/O processor in the command, the management processor selects a second I/O processor in the state of waiting for entry among the plurality of I/O processors as the first destination, based on the state information,
wherein the management processor designates the first destination in the command, and transmits the command to the second I/O processor,
wherein the management server computer is configured to issue a management command for the management processor,
wherein the management server computer is configured to encapsulate and encrypt the management command to generate an encrypted management message, and to transmit the encrypted management message to the management processor,
wherein the management processor is configured to receive the encrypted management message, to decrypt and decapsulate the encrypted management message to restore the management command, and to execute a process based on the management command,
wherein the storage system further comprises:
a maintenance terminal apparatus coupled to the storage apparatus and the management server computer via the first network,
wherein the maintenance terminal apparatus is configured to transmit a request for any I/O processor among the plurality of I/O processors, to the management processor,
wherein the management processor is configured to select an I/O processor among the plurality of I/O processors as a second destination based on the request, to generate a maintenance command, and to transmit the maintenance command to the second destination,
wherein when the maintenance terminal apparatus designates a third I/O processor among the plurality of I/O processors in the request, the management processor selects the third I/O processor as the second destination and determines whether or not the third I/O processor is in the state of waiting for the entry where the third I/O processor is capable of accepting a process based on the request, based on the state information, and
wherein the management processor is configured to transmit the maintenance command to the third I/O processor when the third I/O processor is in the state of waiting for the entry.

2. The storage system according to claim 1,
wherein when the maintenance terminal apparatus designates no I/O processor in the request, the management processor selects a fourth I/O processor in the state of waiting for the entry among the plurality of I/O processors as the second destination, based on the state information and transmits the maintenance command to the fourth I/O processor.

3. The storage system according to claim 2, wherein the management server computer is configured to transmit an instruction of a process for any I/O processor among the plurality of I/O processors, to the management processor, and the management processor is configured to select the second destination from among the plurality of I/O processors, based on the instruction, to generate the command based on the instruction, and to transmit the command to the second destination.

4. A storage apparatus, comprising:

a management processor coupled to a management server computer via a first network; and a plurality of I/O processors that are coupled to the management processor via a second network, and are coupled to a storage device and are configured to execute I/O of the storage device, wherein when an encrypted message that is an encapsulated and encrypted command for any I/O processor among the plurality of I/O processors is received from the management server computer, the management processor decrypts and decapsulates the encrypted message to restore the command based on the command, selects an I/O processor among the plurality of I/O processors as a first destination based on the command, and transmits the command to the first destination, wherein when the management server computer designates a first I/O processor among the plurality of I/O processors in the command, the management processor selects the first processor designated in the command as the first destination, wherein the management processor is configured to store state information that indicates states of the plurality of I/O processors, wherein the management processor is configured to determine whether or not the first I/O processor is in a state of waiting for an entry where the first I/O processor is capable of accepting a process, based on the state information, wherein the management processor is configured to transmit the command to the first I/O processor when the first I/O processor is in the state of waiting for the entry, wherein when the management server computer designates no I/O processor in the command, the management processor selects a second I/O processor in the state of waiting for entry among the plurality of I/O processors as the first destination, based on the state information, wherein the management processor designates the first destination in the command, and transmits the command to the second I/O processor, wherein the management server computer is configured to issue a management command for the management processor, wherein the management server computer is configured to encapsulate and encrypt the management command to generate an encrypted management message, and to transmit the encrypted management message to the management processor, wherein the management processor is configured to receive the encrypted management message, to decrypt and decapsulate the encrypted management message to restore the management command, and to execute a process based on the management command, wherein a maintenance terminal apparatus is coupled to the storage apparatus and the management server computer via the first network, wherein the maintenance terminal apparatus is configured to transmit a request for any I/O processor among the plurality of I/O processors, to the management processor, wherein the management processor is configured to select an I/O processor among the plurality of I/O processors as a second destination based on the request, to generate a maintenance command, and to transmit the maintenance command to the second destination, wherein when the maintenance terminal apparatus designates a third I/O processor among the plurality of I/O processors in the request, the management processor selects the third I/O processor as the second destination and determines whether or not the third I/O processor is in the state of waiting for the entry where the third I/O processor is capable of accepting a process based on the request, based on the state information, and wherein the management processor is configured to transmit the maintenance command to the third I/O processor when the third I/O processor is in the state of waiting for the entry.

* * * * *